April 4, 1939.  L. J. BISHOP  2,153,071
CONVEYER
Filed Jan. 24, 1938   2 Sheets-Sheet 1
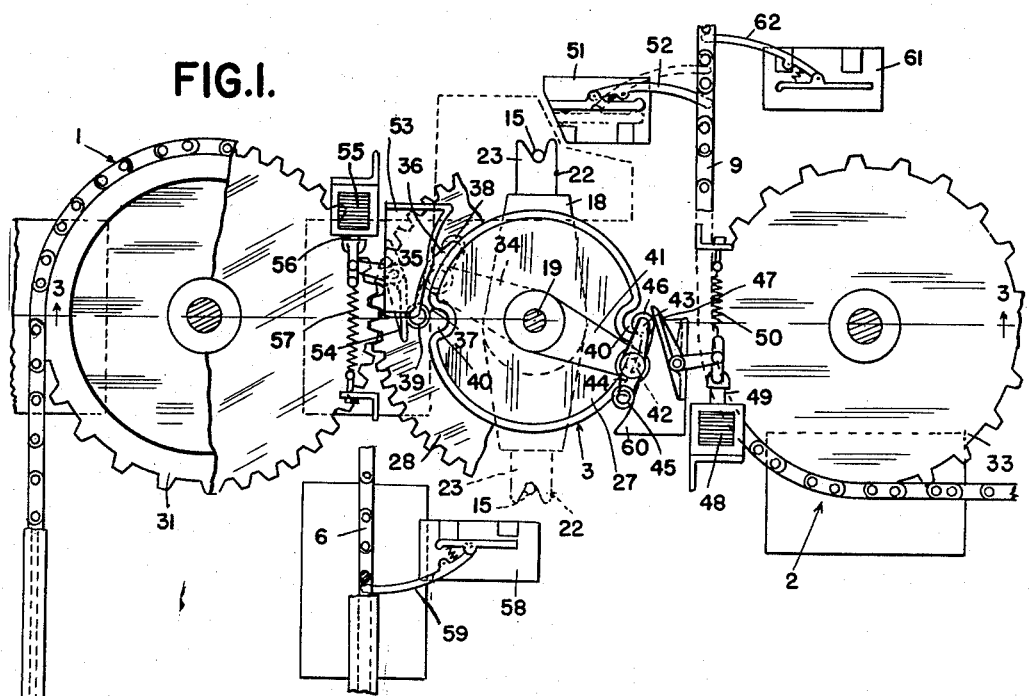
FIG.1.
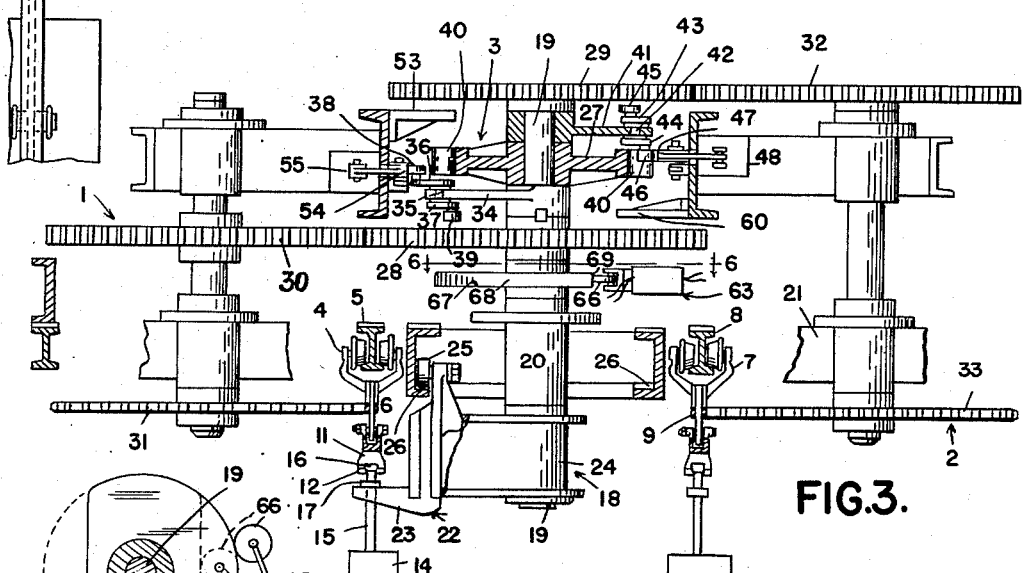
FIG.3.
FIG.6.
INVENTOR
LEONARD J. BISHOP
BY
ATTORNEYS April 4, 1939.   L. J. BISHOP   2,153,071
CONVEYER
Filed Jan. 24, 1938    2 Sheets-Sheet 2
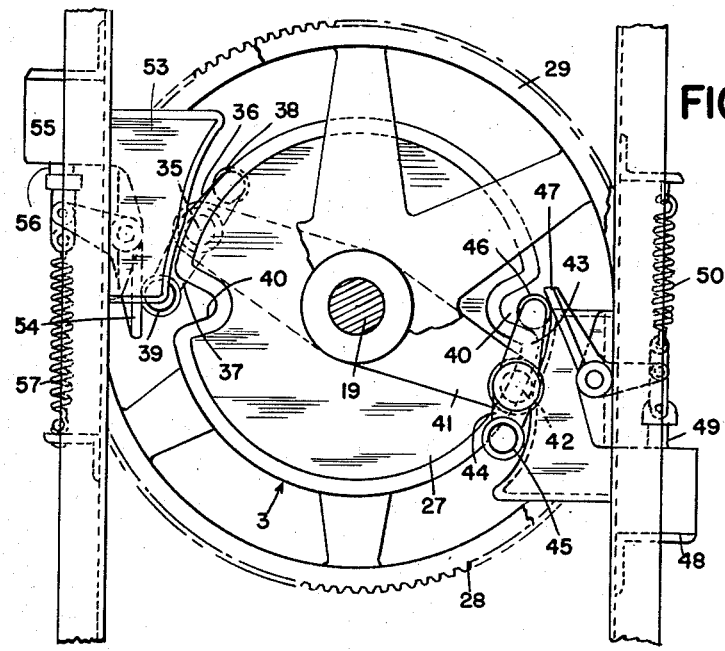
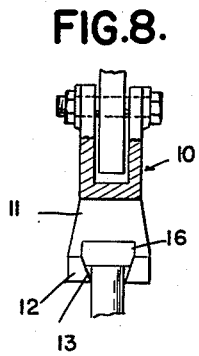
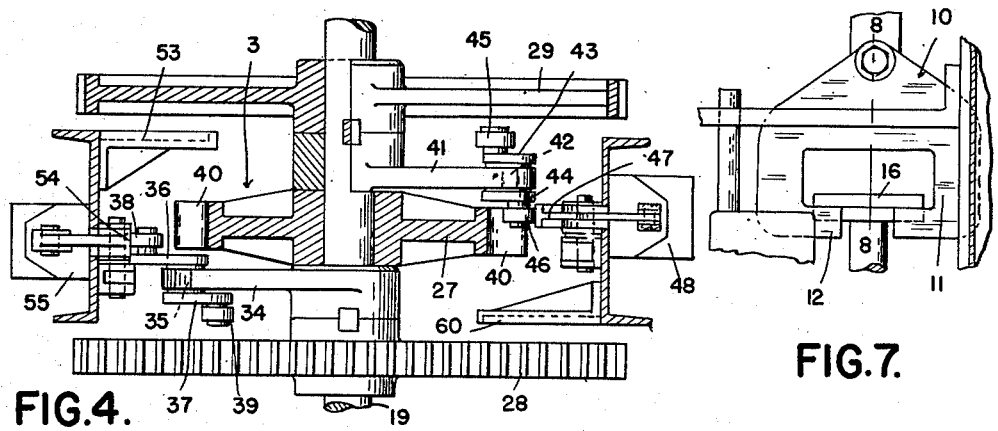
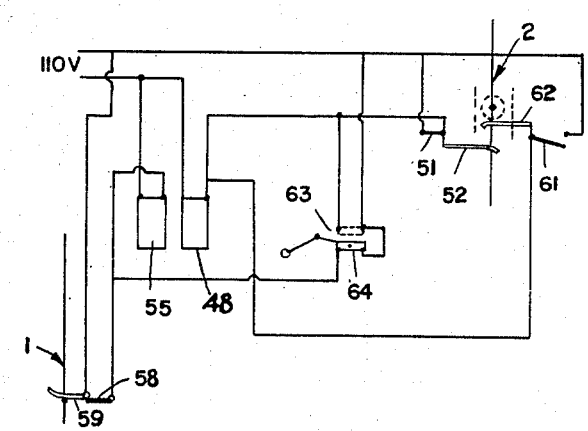
INVENTOR
LEONARD J. BISHOP
BY
ATTORNEYS Patented Apr. 4, 1939

2,153,071

UNITED STATES PATENT OFFICE 2,153,071

CONVEYER

Leonard J. Bishop, Detroit, Mich., assignor to Mechanical Handling Systems, Inc., Detroit, Mich., a corporation of Michigan Application January 24, 1938, Serial No. 186,699

6 Claims. (Cl. 198—25)

The invention relates to work conveyers and has for some of its objects to provide an improved device for transferring work from a loading conveyer to a receiving conveyer; to provide a transfer device which may be rendered operative by work carried by the loading conveyer and which may be rendered inoperative by work carried by the receiving conveyer; and to provide a conveyer system in which the loading and receiving conveyers are advanced independently of each other and the transfer device is advanced during the portions of its movement toward and away from the loading and receiving conveyers at substantially the same rates as these conveyers.

These and other objects of the invention will become apparent from the following description, taken in connection with the accompanying drawings, in which Figure 1 is a fragmentary plan view of a conveyer showing an embodiment of my invention;

Figure 2 is a diagram of the electric circuit;

Figure 3 is a cross section on the line 3—3 of Figure 1;

Figure 4 is a view showing a portion of Figure 3;

Figure 5 is a plan view, with parts broken away, of Figure 4;

Figure 6 is a cross section on the line 6—6 of Figure 3;

Figure 7 is a side elevation of the work supporting portion of one of the trolleys;

Figure 8 is a cross section on the line 8—8 of Figure 7.

While the invention is applicable to work conveyers of various types, it is particularly applicable to work conveyers of the overhead trolley type, which are illustrated.

1 is the loading work conveyer and 2 the receiving work conveyer. 3 is the work transfer device between these conveyers. 4 are trolleys of the loading conveyer, these trolleys being supported upon the track 5 and being advanced by a flexible linear connection such as the chain 6. 7 are trolleys of the receiving conveyer, these trolleys being supported upon the tracks 8 and being advanced by a flexible linear connection such as the chain 9.

The trolleys 4 of the loading conveyer 1 and the trolleys 7 of the receiving conveyer 2 are all formed in the same manner, each having, as shown particularly in Figures 7 and 8, the work supporting portion 10 having the downwardly extending furcations 11. Each of these furcations has at its lower end and edges the lugs 12 which extend toward the lugs 12 on the other furcation, but are spaced therefrom a sufficient distance to provide for insertion or removal of the work therebetween. The lugs upon each furcation have the downwardly and inwardly extending faces 13 which are spaced from each other and which are adapted to cooperate with the work to center the same upon the work supporting portion. The openings between the lugs 12 of each of the furcations 11 extend transversely of the path of travel of the trolleys so that the transfer device during the continued movement of both the trolleys and the transfer device may remove the work from the trolleys of the loading conveyer and transfer the work to the trolleys of the receiving conveyer.

The work, as shown, comprises the article proper 14 and its carrier 15, which latter comprises a vertical rod having the head 16 at its upper end and the enlargement 17 spaced beneath the head a sufficient distance to be spaced below the work supporting portion 10 of a trolley supporting the work. The head 16 has the lower portions of its side faces converging to engage the faces 13 of the lugs 12 upon the work supporting portions 10 of the trolleys.

The loading conveyer 1 and the receiving conveyer 2 are driven independently of each other. These conveyers may have differences in spacing or pitch of the trolleys 4 and 7, or difference in rate of advancement, or a combination of both resulting in a difference in rate of advancement of the trolleys of the conveyers. As shown in the present instance, the rates of advancement of the two conveyers are different, the spacing or pitch of the trolleys 4 and 7 of the two conveyers being the same.

The transfer device 3 comprises the table 18 which is secured to the lower end of the shaft 19. The shaft is journaled in a bearing 20 which is supported in suitable framework 21. The transfer device also comprises a single transfer member 22 having at its lower end the radially outwardly extending arm 23 which is preferably bifurcated at its radially outer end to register with and engage the work and more particularly to embrace the rod of the carrier below the enlargement 17. The transfer member is vertically movable relative to the table 18 and has the vertically extending body 24 which is suitably guided by guides upon the table. The upper end of the body is provided with the roller 25 which is adapted during the rotation of the table to engage the arcuate cam 26 which is supported in fixed position in any suitable manner as by the framework supporting the conveyers. The cam has its cam faces positioned to raise the transfer member when in registration with the work upon the trolley of the loading conveyer, to hold the transfer member in raised position until the transfer member and the work carried thereby are in registration with a trolley of the receiving conveyer and then to allow the transfer member to lower by gravity.

I have also provided means for intermittently rotating the transfer device 3 and advancing the transfer member so that its rate of advancement during its movement toward and away from the loading conveyer 1 is the same as that of the trolleys of this conveyer and its rate of advancement during its movement toward and away from the receiving conveyer 2 is the same as that of the trolleys of this conveyer. To accomplish this, the table 18 is positively connected through the shaft 19 to the pocket member 27. This pocket member is adapted to be rotated alternately by the gears 28 and 29 through suitable intermediate mechanism. Both of these gears are preferably journaled upon the shaft 19. The gear 28 meshes with and has the same pitch diameter as the gear 30 which is driven with the sprocket 31 of the loading conveyer 1. The gear 29 meshes with and has the same pitch diameter as the gear 32 which is driven with the sprocket 33 engaged by the chain of the receiving conveyer 2. The pitch diameters of the gears and sprockets and the radius of the work engaging portion of the transfer member are such that the work engaging portion is advanced at the same rate as the trolleys of the loading conveyer when the driving is being effected through the gears 30 and 28 and at the same rate as the trolleys of the receiving conveyer 2 when the driving is being effected through the gears 32 and 29. The connecting device between the gear 28 and the pocket member 27 comprises the arm 34 rotatable with the gear 28 and in synchronism with the spacing or pitch of the trolleys of the loading conveyer. The arm 34 has the shaft 35 journaled in its outer end. The connecting device also comprises the oppositely extending arms 36 and 37 fixed to the shaft 35 at the upper and lower sides respectively of the arm 34 and respectively carrying at their free ends the rollers 38 and 39. The roller 38 is adapted to engage in the lower zone of one of the diametrically opposite pockets 40 in the periphery of the pocket member 27. The connecting device between the gear 29 and the pocket member 27 is constructed in the same manner and comprises the arm 41 rotatable with the gear 29 and in synchronism with the spacing or pitch of the trolleys of the receiving conveyer. The arm 41 has the shaft 42 journaled in its outer end. The connecting device also comprises the oppositely extending arms 43 and 44 fixed to the shaft 42 at the upper and lower sides respectively of the arm 41 and respectively carrying at their free ends the rollers 45 and 46. The roller 46 is adapted to engage in the upper zone of one of the pockets 40. Both of the rollers 38 and 46 when forced into engagement with the pockets normally remain in engagement therewith until they are forcibly removed.

The transfer member 22 when at rest occupies either the position shown in full lines, or the position shown in dotted lines in Figure 1, the transfer member being respectively raised and lowered in the two positions. However, the gears 28 and 29 and their respective arms 34 and 41 continuously revolve in timed relation to the loading and receiving conveyers respectively.

To effect advancement of the transfer member 22 from the position shown in full lines to the position shown in dotted lines, I have provided means controlled by a trolley of the receiving conveyer 2. This means comprises the bell crank lever 47 having one arm positioned to engage the roller 46 only to force the same into the adjacent pocket 40, the electromagnet 48 having its core 49 connected to the other arm of the bell crank lever and the coil spring 50 which is also connected to the other arm of the bell crank lever. The bell crank lever, the electromagnet and the coil spring are all mounted on suitable framework which is carried from the framework carrying the track and the receiving conveyer 2. The core of the electromagnet upon energization of the electromagnet is adapted to swing the bell crank in a direction away from the pocket member 27, while the coil spring is adapted to swing the bell crank in a direction toward the pocket member. 51 is a switch which has an arm 52 adapted to be temporarily contacted by a trolley of the receiving conveyer 2 to temporarily open the circuit to the electromagnet 48 at a time during the advancement of the trolley of the receiving conveyer such that the transfer member 22 will be swung so that it and the work carried thereby will register with the trolley. It will be seen that when the circuit is opened the associated coil spring 50 through the bell crank lever 47 compels the roller 46 to engage in the adjacent pocket 40 of the pocket member 27 so that this pocket member will be rotated. The openinig of the circuit occurs when the roller 46 registers with the adjacent pocket 40 so that the bell crank lever immediately forces the roller into the pocket. The rotation continues through 180 degrees and is stopped by reason of the roller 45 coming into contact with the cam 53, which latter is mounted upon the framework and compels the roller 46 to move out of the pocket.

Assuming the transfer member 22 to be in the position indicated by dotted lines in Figure 1, the advancement of this transfer member is effected by the bell crank lever 54 having one arm positioned to engage the roller 38 only to force the same into the adjacent pocket 40. This device also comprises the electromagnet 55 having the core 56 connected to the other arm of the bell crank lever and the coil spring 57 also connected to the other arm of the bell crank lever. The bell crank lever, the electromagnet and the coil spring are mounted and operated in the same manner as those previously described. 58 is a switch in the same circuit as the electromagnet 55 and having an arm 59 adapted to be temporarily engaged by the work carried by one of the trolleys of the loading conveyer 1 to temporarily open the circuit at a time such that the roller 38 registers with the adjacent pocket 40 and such that the transfer member 22 will be swung from its position indicated in dotted lines to register with the work carried by this trolley and receive the work. The opening of the circuit occurs when the roller 38 registers with the adjacent pocket 40. The movement will continue until the roller 39 comes into engagement with the cam 60 which is mounted on the framework and compels the roller 38 to move out of the pocket.

To avoid advancement of the transfer member 22 from the position shown in full lines to the position shown in dotted lines when the trolley of the receiving conveyer which would receive the work during this advancement is also carrying work, I have provided the switch 61. This switch is at a lower level than the switch 51 and has an arm 62 which is adapted to be temporarily engaged by the work carried by the trolley to close a second circuit including the electromagnet 48 preferably slightly prior to opening of the switch 51 and while this switch remains open. As a result, the electromagnet 48 remains energized so that the transfer member 22 is not operatively connected to the receiving conveyer 2.

The switches 51, 58 and 61 are preferably constructed in the same manner and are a standard type of limit switch.

For the purpose of preventing the rollers 38 and 46 from being simultaneously forced into engagement with the pockets 40 and damaging the transfer device, I have provided the cam controlled switch 63 having one pair of terminals in a second circuit including the electromagnet 55 and another pair of terminals in a third circuit including the electromagnet 48. These pairs of terminals are adapted to be alternately bridged by the contact member 64 which is actuated by the pivotal arm 65 having the roller 66 engageable with the cam 67, the construction being particularly illustrated in Figure 6. As shown particularly in Figure 3, the cam is fixed upon the shaft 19 below the gear 28 and has, as shown, the surface 68 concentric with the axis and the flattened surface 69, these surfaces being engageable with the roller 66. The cam is secured to the shaft so that when the transfer member 22 is in the position indicated in full lines in Figure 1 the roller 66 is in engagement with the surface 68 and the movable contact member 64 is in the position indicated in full lines in Figures 2 and 6 to close the circuit including the electromagnet 55 and to open the circuit including the electromagnet 48. As a result, the electromagnet 55 remains in a closed circuit so that its associated bell crank lever cannot be operated to force the roller into a pocket of the pocket member, regardless of the opening of the switch 58. When the transfer member 22 is in the position indicated in dotted lines in Figure 1, the roller 66 is in engagement with the flattened surface 69 and the movable contact member 64 is in the position indicated in dotted lines in Figures 2 and 6 to close the circuit including the electromagnet 48, and to open the circuit including the electromagnet 55. As a result, the electromagnet 48 remains in a closed circuit so that its associated bell crank lever cannot be operated to force the roller into a pocket of the pocket member, regardless of the opening of the switch 51. It will thus be seen that both rollers 38 and 46 cannot be simultaneously forced into the pockets of the pocket member to operatively connect the transfer device to both conveyers.

What I claim as my invention is:

1. The combination with a loading work conveyer and a receiving work conveyer advanced independently of said loading conveyer, of a device movable toward and away from said loading conveyer and receiving conveyer for transferring work from the former to the latter, and means for advancing said device during the portion of its movement toward and away from said loading conveyer at substantially the same rate as that of said loading conveyer and for advancing said device during the portion of its movement toward and away from said receiving conveyer at substantially the same rate as that of said receiving conveyer.

2. The combination with a loading work conveyer and a receiving work conveyer, of a rotatable device for transferring work from said loading conveyer to said receiving conveyer, a main rotatable member connected to said device, an auxiliary rotatable member driven from said loading conveyer, an auxiliary rotatable member driven from said receiving conveyer, members movable with said auxiliary rotatable members adapted to be connected to said main rotatable member, and means for controlling the connection of said members with said main rotatable member.

3. The combination with a loading work conveyer and a receiving work conveyer, of a rotatable device for transferring work from said loading conveyer to said receiving conveyer, a main rotatable member connected to said device, an auxiliary rotatable member driven from said loading conveyer, an auxiliary rotatable member driven from said receiving conveyer, members movable with said auxiliary rotatable members adapted to be connected to said main rotatable member, means operable by work on said loading conveyer for controlling the connection of said main rotatable member and first mentioned auxiliary rotatable member, and means operable by said receiving conveyer for controlling the connection of said main rotatable member and second mentioned auxiliary rotatable member.

4. The combination with a loading work conveyer of the trolley type and a receiving work conveyer of the trolley type, of a transfer device between said conveyers operable to remove the work from a trolley of said loading conveyer and to transfer the work to a trolley of the receiving conveyer, said transfer device comprising a member movable through a circular path and engageable with the work, a main rotatable member connected to said first mentioned member, an auxiliary rotatable member driven from said loading conveyer, an auxiliary rotatable member driven from said receiving conveyer, members movable with said auxiliary rotatable members adapted to be connected to said main rotatable member, connecting members adapted to occupy operative and inoperative positions, means associated with each of said conveyers for moving said connecting members into their operative and inoperative positions, means operable by work carried by a trolley of said loading conveyer to render the associated means operative to move the associated connecting means to operative position, means operable by a trolley of said receiving conveyer to render the associated means operative to move said associated connecting means to operative position, and means operable by work carried by the last mentioned trolley for rendering said last mentioned means inoperative.

5. The combination with a loading work conveyer of the trolley type and a receiving work conveyer of the trolley type, said conveyers being advanced independently of each other, of a transfer device between said conveyers operable to remove the work from a trolley of said loading conveyer and to transfer the work to a trolley of the receiving conveyer, and means for advancing said device during the portion of its movement away from said loading conveyer at substantially the same rate as that of the trolleys of said loading conveyer and for advancing said device during the portion of its movement toward and away from said receiving conveyer at substantially the same rate as that of the trolleys of said receiving conveyer.

6. The combination with a loading work conveyer of the trolley type and a receiving work conveyer of the trolley type, of a transfer device between said conveyers operable to remove the work from a trolley of said loading conveyer and to transfer the work to a trolley of said receiving conveyer, said transfer device comprising a main rotatable member, an auxiliary rotatable member driven from said loading conveyer, an auxiliary rotatable member driven from said receiving conveyer, members movable with said auxiliary rotatable members adapted to be connected to said main rotatable member, means operable by work on said loading conveyer for controlling the connection of said main rotatable member and said first mentioned auxiliary rotatable member, means operable by a trolley of said receiving conveyer for controlling the connection of said main rotatable member and said second mentioned auxiliary rotatable member, and means for alternately rendering said controlling means inoperative.

LEONARD J. BISHOP.